United States Patent
Hsu (10) Patent No.: US 7,625,012 B2
(45) Date of Patent: Dec. 1, 2009

(54) FENDER FASTENABLE TO A BICYCLE BRACING POST

(75) Inventor: Kuo-Chung Hsu, Changua (TW)

(73) Assignee: Sunnywheel Industrial Co., Ltd., Changhua (TW)

( * ) Notice: Subject to any disclaimer, the term of this patent is extended or adjusted under 35 U.S.C. 154(b) by 247 days.

(21) Appl. No.: 11/812,981

(22) Filed: Jun. 22, 2007

(65) Prior Publication Data

US 2008/0315547 A1    Dec. 25, 2008

(51) Int. Cl.
*B62D 25/18* (2006.01)
(52) U.S. Cl. .............. 280/847; 280/152.1; 280/152.3; 280/848; 280/849; 280/851; 280/852
(58) Field of Classification Search .......... 280/847, 280/152.1, 152.3, 848, 849, 851, 852
See application file for complete search history.

(56) References Cited

U.S. PATENT DOCUMENTS 5,562,296 A * 10/1996 Hall et al. ................ 280/152.3
D456,329 S * 4/2002 Thomas ..................... D12/186
7,431,316 B2 * 10/2008 Chuang .................... 280/152.3
2003/0116937 A1 * 6/2003 Blythe ...................... 280/152.1
2007/0085296 A1 * 4/2007 Chuang .................... 280/152.1

FOREIGN PATENT DOCUMENTS

FR        2681040 A1 *  3/1993
FR        2960125 A1 * 10/1993

* cited by examiner

*Primary Examiner*—S. Joseph Morano
*Assistant Examiner*—John R Olszewski
(74) *Attorney, Agent, or Firm*—Rosenberg, Klein & Lee (57) ABSTRACT

A fender fastenable to a bicycle bracing post includes at least a fender body and a fastening assembly. The fender body has a front section on which a concave portion, a slit and a holding space are formed. The slit can be opened elastically to allow a bicycle rear fork to be held in the holding space. The fastening means and the fender body can be coupled and adjusted to quickly install the fender on the bicycle bracing post. As a result more space is available to hold other bicycle accessories.

7 Claims, 8 Drawing Sheets

FENDER FASTENABLE TO A BICYCLE BRACING POST

BACKGROUND OF THE INVENTION

1. Field of the Invention

The present invention relates to a fender fastenable to a bicycle bracing post and particularly to a fender that is different from the conventional fender by fastening to the bicycle bracing post to increase installation space for other bicycle accessories.

2. Description of the Prior Art

Figure 1:
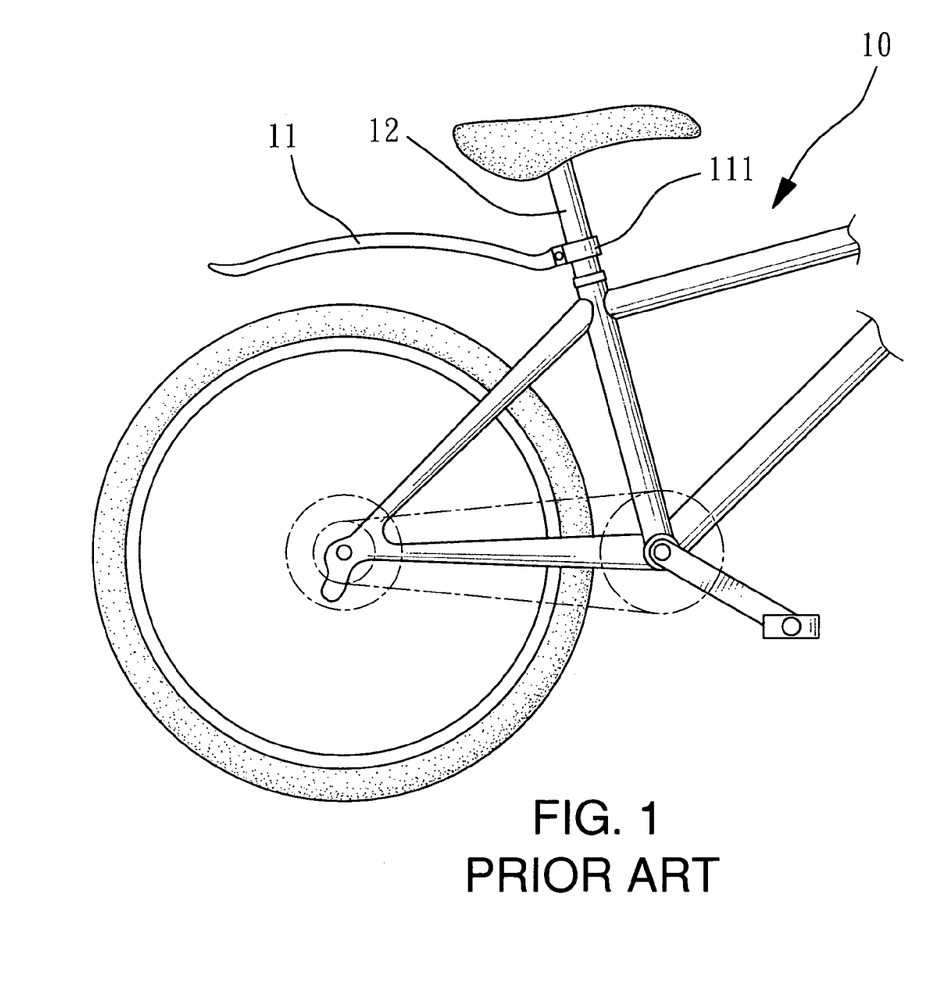
FIG. 1 is a schematic view of a conventional fender in an installation condition.
Figure 2:
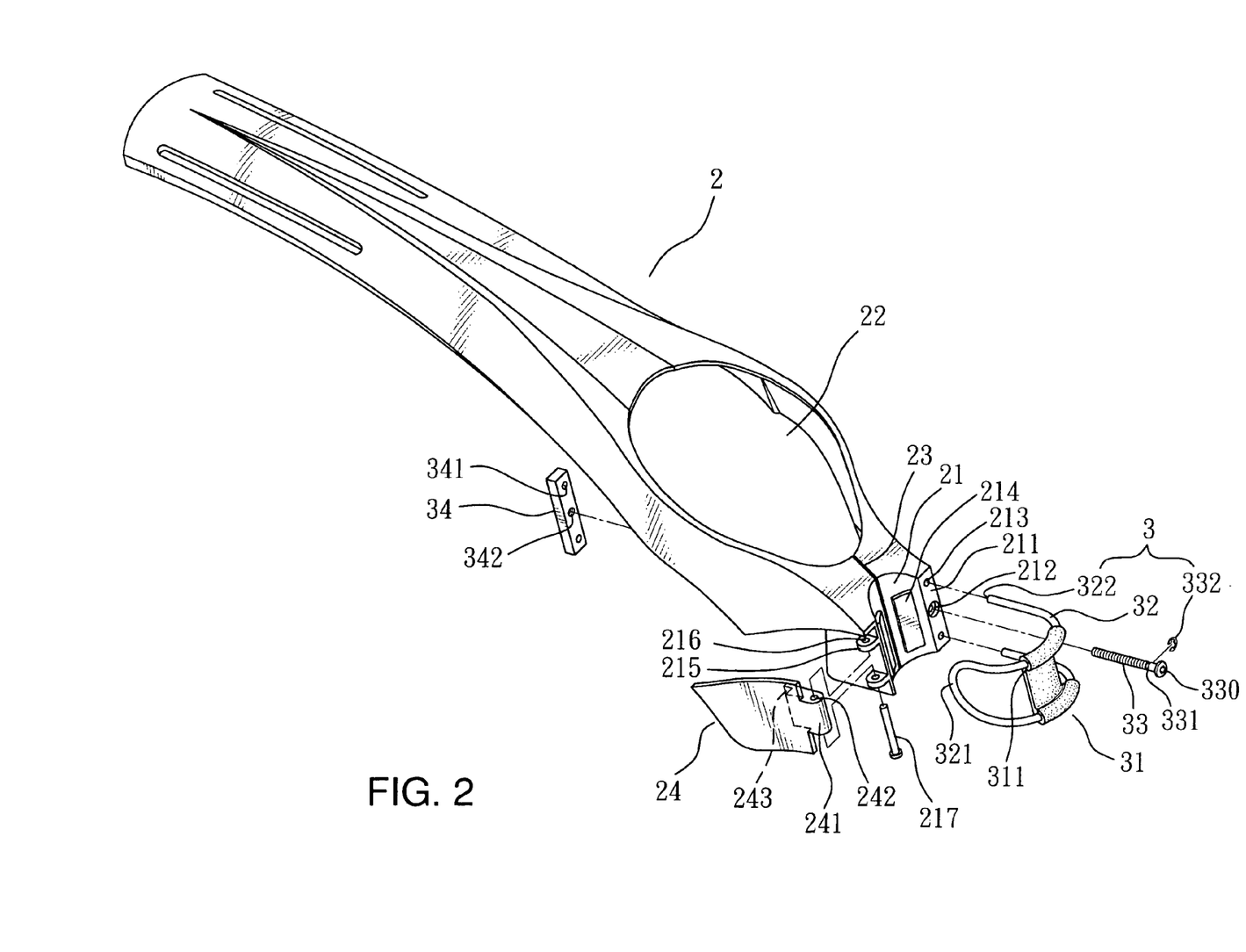
FIG. 2 is an exploded view of the invention.
Figure 3:
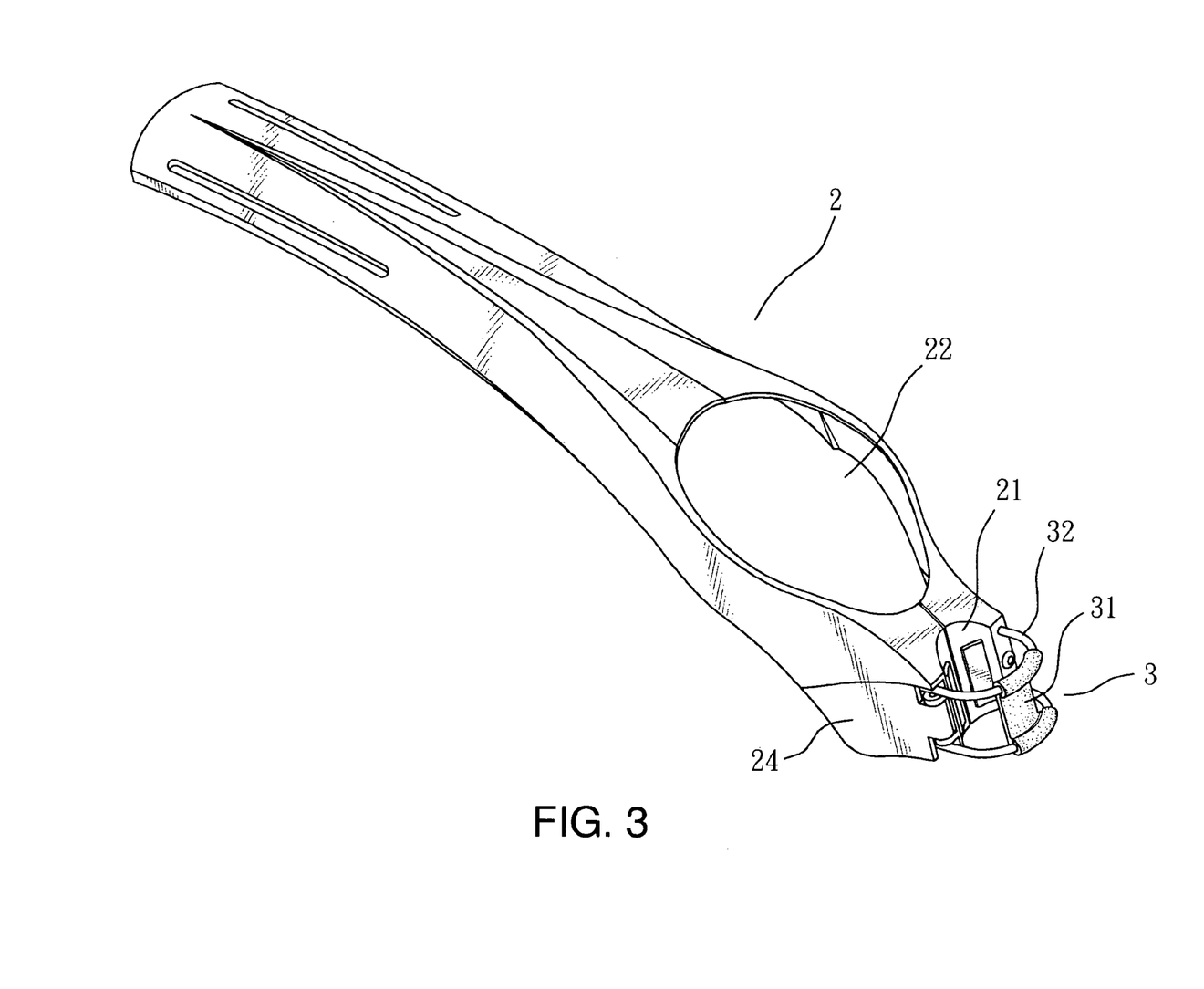
FIG. 3 is a perspective view of the invention.
Figure 4:
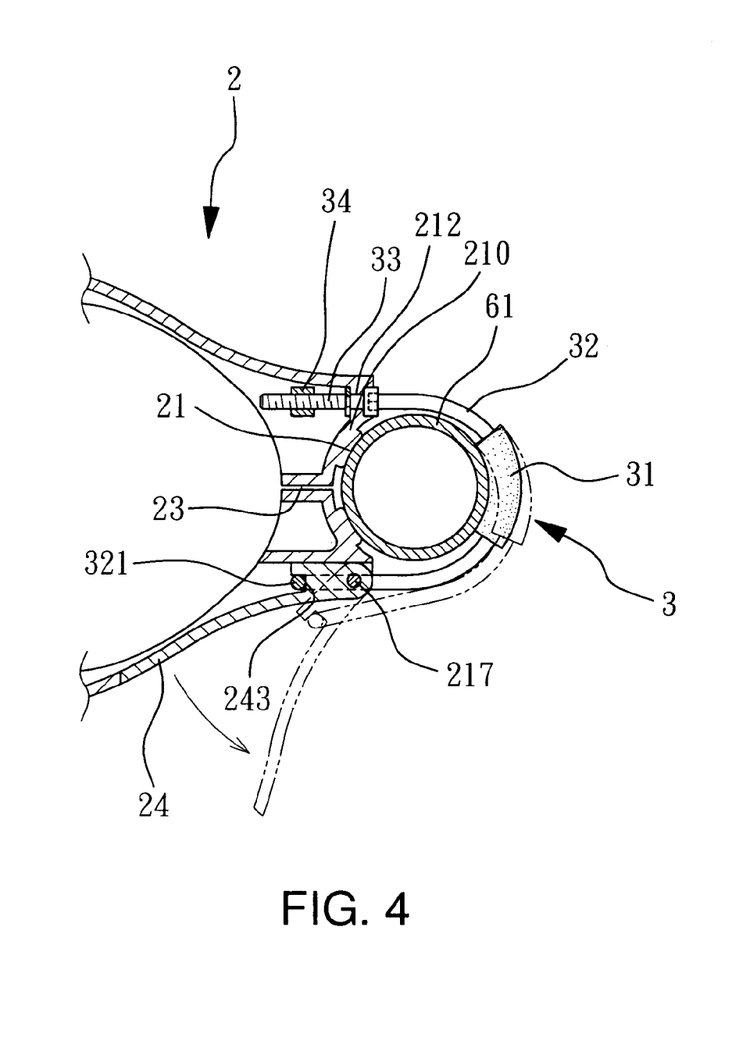
FIG. 4 is a cross section of the invention in an assembly condition.

Refer to FIG. 1 for a conventional fender 11 installed on a bicycle 10. The fender 11 has a fastening means 111 at a front end to clip a seat post 12 of the bicycle 10. To meet user's requirements there are a wide variety of bicycle accessories have been introduced such as alarm lights, article holding boxes, article holding bags and the like. The seat post 12 happens to be a desirable location to hold these accessories. Because the fender 11 has already been installed on the seat post 12, installation of the other accessories become difficult. This creates a lot of troubles for users.

SUMMARY OF THE INVENTION

In view of the aforesaid problem, the present invention aims to provide a fender fastenable to a bicycle bracing post that is different from the conventional fender. It includes at least a fender body and a fastening assembly. The fender body has a front section on which a concave portion, a slit and a holding space are formed. The slit can be opened elastically to allow a bicycle rear fork to be held in the holding space. The fastening means and the fender body can be coupled and adjusted to quickly install the fender on the bicycle bracing post. Therefore the seat post that originally holds the fender can be freed to hold other bicycle accessories.

In one aspect the fender has a tail end to fasten to an alarm light to enhance safety of bicycle riding.

In another aspect the tail end of the fender can be coupled with an extension plate. The extension plate has side edges wedged in inner sides of the fender body and is extendable to a longer length by pulling according requirement. The extension plate has a distal end which can be coupled with an alarm light to enhance safety of bicycle riding.

The foregoing, as well as additional objects, features and advantages of the invention will be more readily apparent from the following detailed description, which proceeds with reference to the accompanying drawings.

DESCRIPTION OF THE PREFERRED EMBODIMENTS

Referring to FIGS. 2, 3, 4 and 6, the invention provides a fender 2 which includes at least a fender body 2 and a fastening assembly 3.

The fender body 2 has a front section which includes a concave portion 21, a slit 23 and a holding space 22. The slit 23 has two ends communicating respectively with the concave portion 21 and the holding space 22, and can be elastically opened to allow a rear fork 62 of a bicycle 6 to be held in the holding space 22. The concave portion 21 has at least one pliable pad 214 bonded thereon and one side 211 with a cable threading hole 213 and a fastening hole 212 formed thereon, and another side with a hinge seat 215 formed thereon to be coupled with a holding member 24.

The fastening assembly 3 is corresponding to the concave portion 21 to clip a bracing post 61 of the bicycle 6. It includes a body 31, a cable 32, a tuning bolt 33 and a fastening member 34. The body 31 has a upper rim and a lower rim that have respectively a threading hole 311 formed thereon to allow the cable 32 to tread through. The fastening member 34 is located at a rear side of a wall 210 of the concave portion 21, and has at least a cable fastening end 341 to be fastened by an open end 322 of the cable 32, and a screw hole 34 to be fastened by the tuning bolt 33.

The holding member 24 is a plate to hold the cable 32 tightly, and has one end with a flange 241 formed thereon. The flange 241 has a pin hole 242 to receive a pin 217 to hinge with another pin hole 216 formed on the hinge seat 21 5. There is a notch 243 behind the flange 241 to allow a closed end 321 of the cable 32 to be latched thereon.

Figure 5:
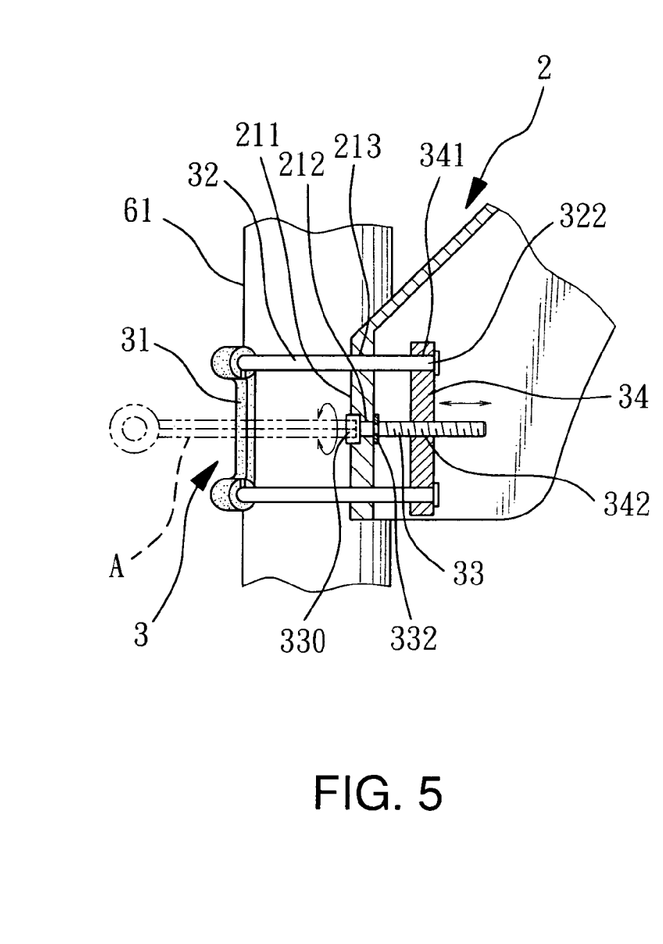
FIG. 5 is a schematic view of the invention in an operating condition.
Figure 6:
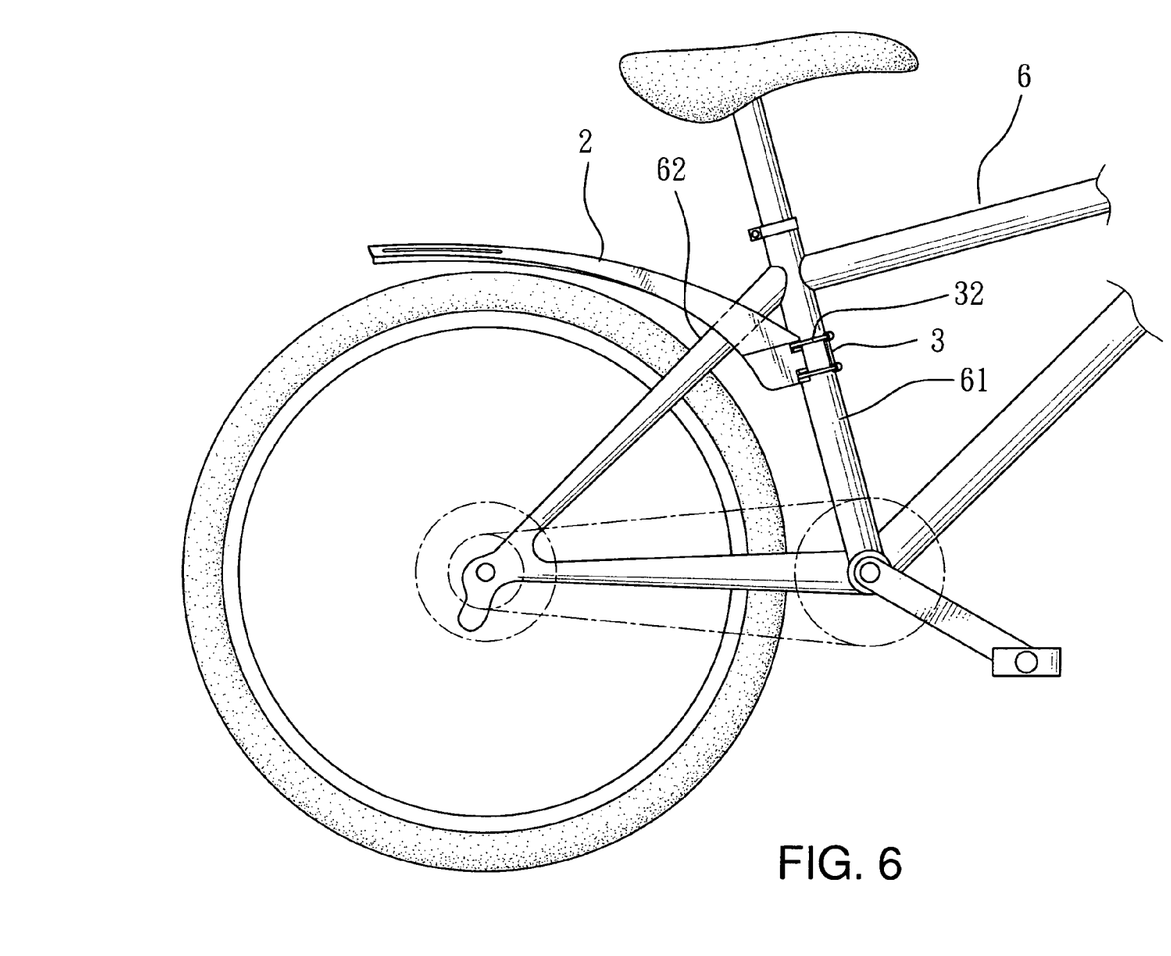
FIG. 6 is a schematic view of an embodiment of the invention.

Referring to FIGS. 5 and 6, to install the invention on the bracing post 61, first, move the concave portion 21 outwards from two sides to elastically extend the slit 23 to a larger size to allow the rear fork 62 to run through and be held in the holding space 22; select a desired elevation on the bracing post 61 for installation; latch the closed end 321 of the cable 32 on the notch 243 of the holding member 24 with the open end 322 of the cable 32 threading through the cable threading hole 213 to be fastened to the cable fastening end 341 of the fastening member 34; and insert the tuning bolt 33 into the fastening hole 212 at one side of the concave portion 21 to be fastened with the screw hole 342 of the fastening member 34. The tuning bolt 33 has an action end 330 to be engaged with a tool A for turning. The tuning bolt 33 has an annular groove 331 close to the action end 330 to be clipped by an elastic clip 332. Hence when the tool A is in operation the tuning bolt 33 is confined to the wall 210 and rotates without moving away. The fastening member 34 can be moved forwards or rearwards along the tuning bolt 33 to move the cable 32 forwards or rearwards to adjust the tightness thereof (referring to FIGS. 4 and 5). After the cable 32 has been adjusted at a desired tightness, swivel the holding member 24 rearwards about the pin 217 to lean over the fender body 2 to enhance the fastening firmness.

Figure 7:
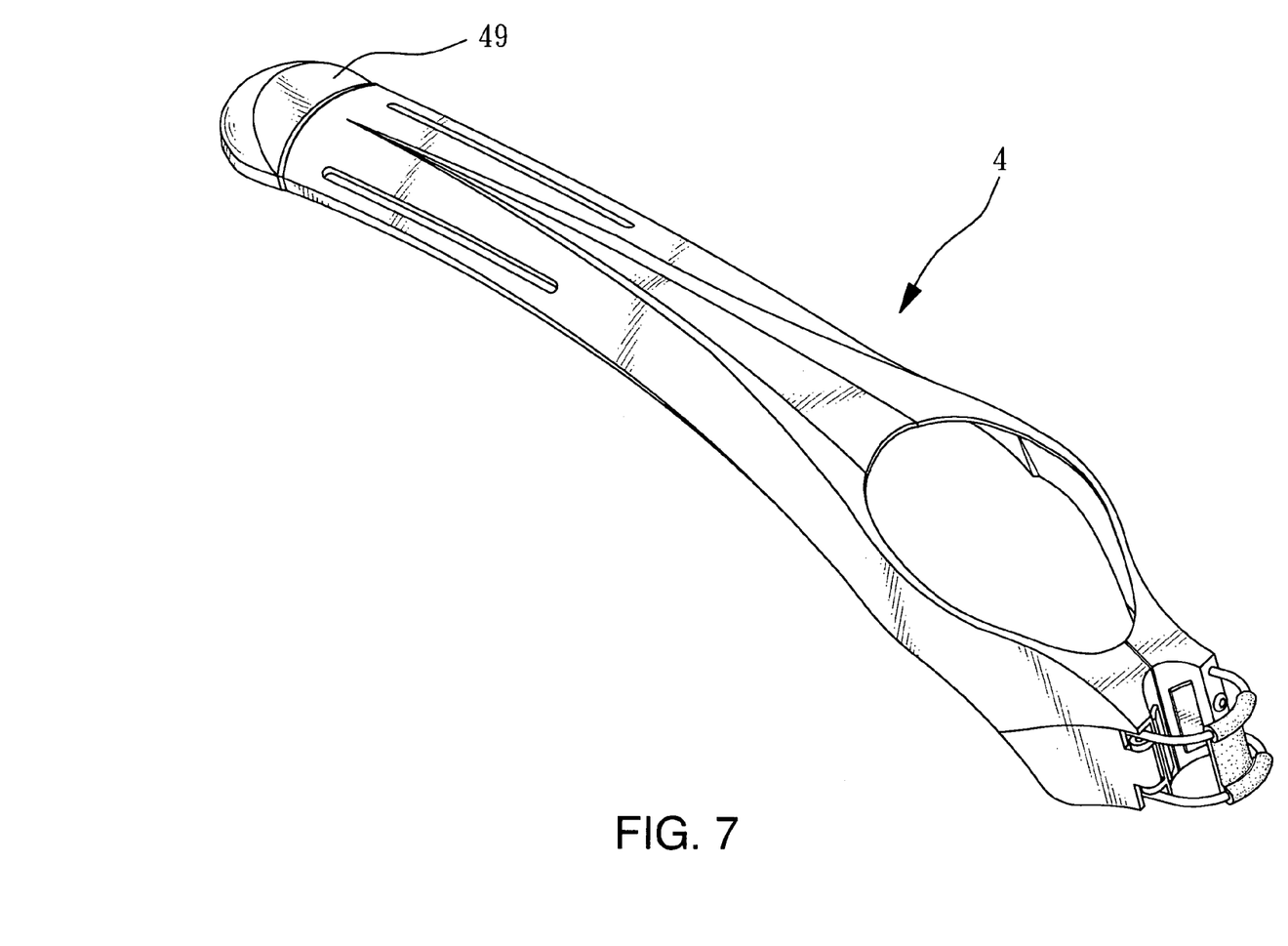
FIG. 7 is a perspective view of another embodiment of the invention.

Refer to FIG. 7 for another embodiment of the fender of the invention. The fender body 4 has a tail end which can be coupled with an alarm light 49 to enhance bicycle riding safety.

Figure 8:
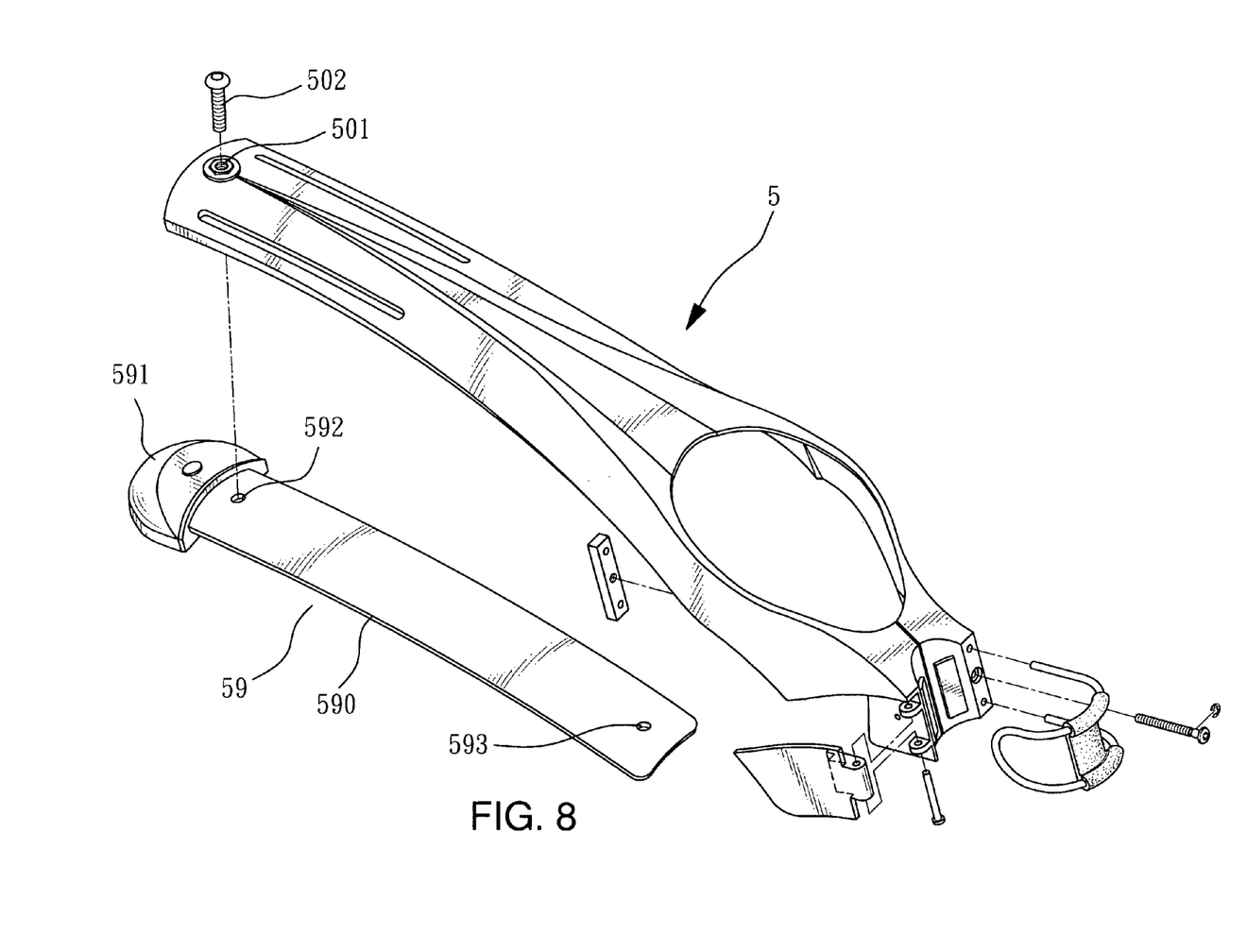
FIG. 8 is an exploded view of another embodiment of the invention.
Figures 9, 10:
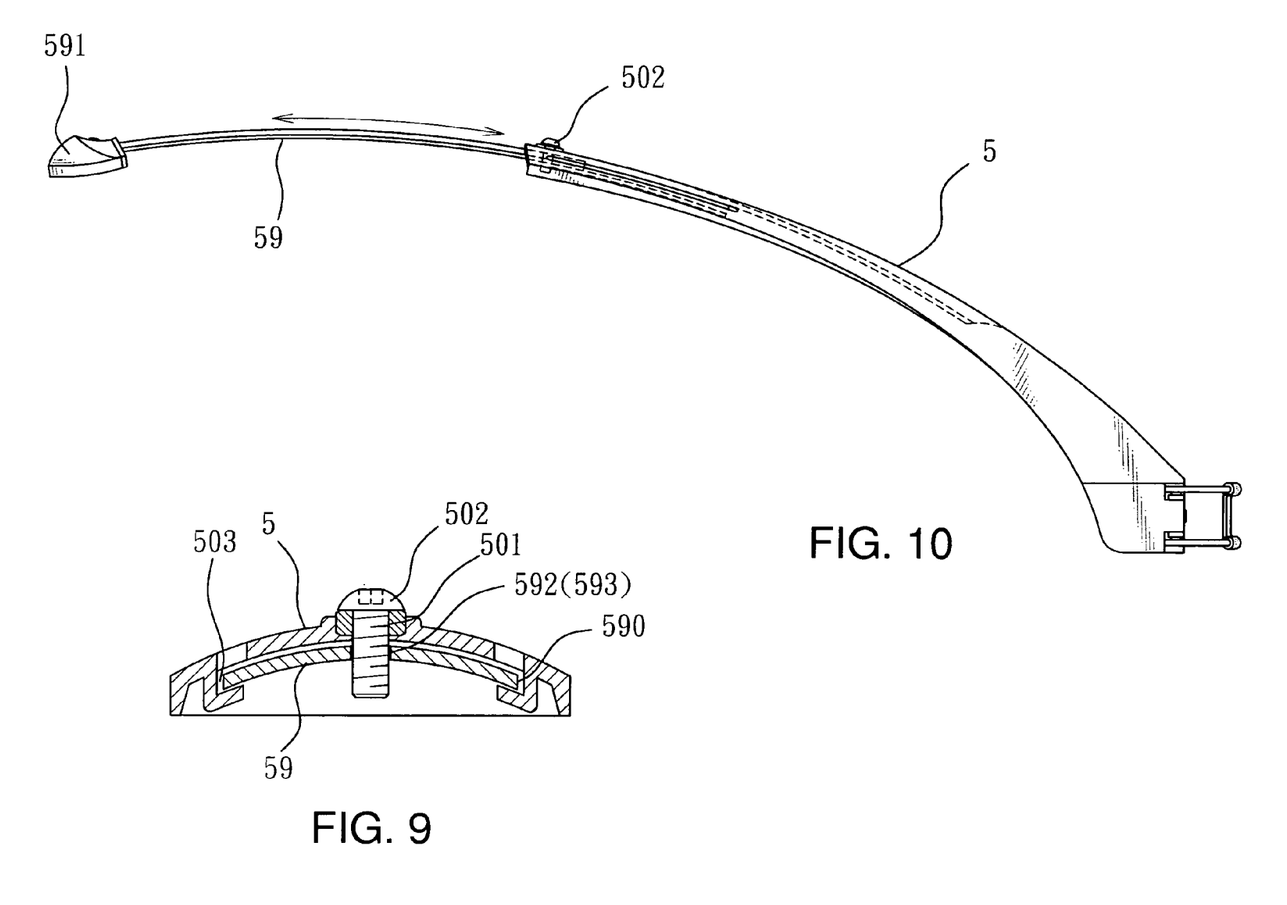
FIG. 9 is a cross section of another embodiment of the invention.
FIG. 10 is a schematic view of another embodiment of the invention in an operating condition.

Refer to FIG. 8 for yet another embodiment of the fender of the invention. The fender body 5 can be coupled with an extension plate 59 which has two lateral edges 590 wedged in flutes 503 formed at two inner sides of fender body 5 (referring to FIGS. 9 and 10). Thereby the fender can be extended to a desired length according to requirements. The extension plate 59 has one or more fastening holes 592 and 593. The fender body 5 has a fastening screw hole 501 to receive a screw 502 to run through the fastening holes 592 and 593 to fasten the fender body 5 and the extension plate 59. The extension plate 59 further has a tail end to couple with an alarm light 591. Thus the alarm light 591 can be moved at an extended position according to requirements to enhance riding safety.

In short, the invention is different from the conventional fender structure, and provides more space to hold other bicycle accessories. It also can be coupled with the alarm light to enhance riding safety. It is a novel design and offers a significant improvement over the conventional bicycle fenders.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

I claim:

1. A fender fastenable to a bicycle bracing post comprising at least a fender body and a fastening assembly, wherein:
   the fender body has a front end which has a concave portion, a slit and a holding space formed thereon, the slit having two ends communicating respectively with the concave portion and the holding space so that the slit is elastically openable to allow a rear fork of a bicycle to be held in the holding space;
   the fastening assembly is corresponding to the concave portion to clip the bicycle bracing post.

2. The fender of claim 1, wherein the concave portion has one side which has at least one cable threading hole and one fastening hole formed thereon.

3. The fender of claim 1, wherein the concave portion has another side which has a hinge seat formed thereon to be coupled with a holding member, the holding member having a flange at one end and a notch behind the flange.

4. The fender of claim 1, wherein the fastening assembly includes a body, a cable, a tuning bolt and a fastening member, the body having a upper rim and a lower rim that have respectively a threading hole formed thereon to allow the cable to tread through, the fastening member being located at a rear side of a wall of the concave portion and having at least one cable fastening end to be fastened by an open end of the cable and a screw hole to be fastened by the tuning bolt.

5. The fender of claim 1, wherein the fender body has a tail end coupling with an alarm light.

6. The fender of claim 1, wherein the fender body is coupled with an extension plate which has two edges wedged in inner flutes formed at inner sides of the fender body.

7. The fender of claim 1, wherein the concave portion is bonded to at least one pliable pad.

* * * * *